(12) United States Patent
Newman, Jr. et al.

(10) Patent No.: US 8,313,219 B2
(45) Date of Patent: Nov. 20, 2012

(54) BALLASTED LAMP SOCKET FOR A COMPACT FLUORESCENT LAMP

(75) Inventors: Robert C. Newman, Jr., Emmaus, PA (US); Mark S. Taipale, Harleysville, PA (US); Gregory R. Scholz, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 1448 days.

(21) Appl. No.: 11/835,950

(22) Filed: Aug. 8, 2007

(65) Prior Publication Data

US 2009/0039799 A1 Feb. 12, 2009

(51) Int. Cl.
*F21S 1/02* (2006.01)

(52) U.S. Cl. ........ 362/365; 362/364; 362/362; 362/378; 362/191

(58) Field of Classification Search .................. 315/362, 315/190, 191, 198, 368, 370, 374, 375, 376, 315/377, 378; 362/191, 190, 154, 362, 198, 362/365, 368, 378, 364
See application file for complete search history.

(56) References Cited

U.S. PATENT DOCUMENTS

| | | | |
|---|---|---|---|
| 6,162,096 A | 12/2000 | Klaus | |
| 6,390,646 B1 | 5/2002 | Yan | |
| 6,488,386 B1 | 12/2002 | Yan | |
| 6,494,730 B1 | 12/2002 | Yan | |
| 6,531,824 B1 | 3/2003 | Yan | |
| 6,779,911 B2 | 8/2004 | Chang | |
| 6,802,730 B2 | 10/2004 | Chang | |
| 7,125,159 B2 | 10/2006 | Hirsch et al. | |
| 7,224,125 B2 | 5/2007 | Ribarich | |
| 2002/0093279 A1 | 7/2002 | Chen | |
| 2003/0001516 A1 | 1/2003 | Newman | |
| 2004/0174701 A1 | 9/2004 | Fiene | |
| 2005/0104524 A1 | 5/2005 | Bishop | |
| 2007/0188103 A1 | 8/2007 | Ribarich | |
| 2009/0203254 A1* | 8/2009 | Weber et al. ................ | 439/541 |

OTHER PUBLICATIONS

International Search Report dated Jan. 7, 2009 corresponding to International Patent Application No. PCT/US2008/009481.

* cited by examiner

*Primary Examiner* — Tuyet Thi Vo
(74) *Attorney, Agent, or Firm* — Ostrolenk Faber LLP

(57) ABSTRACT

A ballasted lamp socket for a gas discharge lamp, such as a compact fluorescent lamp, is adapted to replace an Edison screw-in lamp socket in a ceiling mounted light fixture, or a table or floor lamp. The ballasted lamp socket comprises a lamp-receiving portion adapted to be coupled to the gas discharge lamp, an enclosure mechanically coupled to the lamp-receiving portion, a dimming ballast circuit electrically coupled to the lamp-receiving portion and housed within the enclosure, and first and second electrical connections. The ballast portion is adapted to receive an AC line voltage and to generate a high-frequency AC voltage for driving the gas discharge lamp and controlling the light intensity of the gas discharge lamp between a high-end intensity and a low-end intensity. The first and second electrical connections are operable to receive the AC line voltage and to provide the AC line voltage to the ballast circuit.

19 Claims, 16 Drawing Sheets

BALLASTED LAMP SOCKET FOR A COMPACT FLUORESCENT LAMP

BACKGROUND OF THE INVENTION

The present invention relates to a ballasted lamp socket for use with a gas discharge lamp, such as a fluorescent lamp. More specifically, the present application relates to a ballasted lamp socket for a compact fluorescent lamp suitable for replacement of an Edison screw-in socket in a conventional ceiling mounted light fixture, or a table or floor lamp.

Typically, gas discharge lamps, such as fluorescent lamps, must be driven by electronic ballasts in order to illuminate properly. Electronic ballasts receive an alternating-current (AC) line voltage from an AC power source, and generate a high-frequency AC voltage for driving the fluorescent lamps. The typical fluorescent lamp is a sealed glass tube containing a rare earth gas and having an electrode at each end for striking and maintaining an electric arc through the gas. The electrodes are typically constructed as filaments to which a filament voltage is applied to heat the electrodes, thereby improving their capability to emit electrons. Each filament requires two electrical connections, such that the filament voltage may be applied to the filament. Therefore, for a single fluorescent lamp having two filaments, four electrical connections (e.g., electrical wires) must be coupled between the ballast and the fluorescent lamp.

The use of compact fluorescent lamps ("CFLs") has increased greatly over the last several years. These CFLs typically are more efficient and provide a longer operational life when compared to conventional incandescent lamps. Indeed, the recent spike in energy costs has lead to a greater demand for CFLs. In fact, in certain areas, such as California, for example, state law requires all new construction to be outfitted for the use of CFLs exclusively.

There are, however, some complications that have arisen with the increased use of CFLs. As an initial matter, most presently existing light fixtures are not compatible for use with CFLs. Specifically, the base of an incandescent lamp is substantially different than that of a CFL. Thus, the sockets in conventional light fixtures, which are generally referred to as Edison sockets, are not compatible with many CFLs.

FIG. 1 illustrates a conventional ceiling mounted downlight fixture 1000 that accommodates a conventional incandescent lamp (not shown). The fixture 1000 includes a housing 1004 in which a socket 1006 is mounted. In a preferred embodiment, a plurality of mounting clips 1008 are attached to the housing 1004 such that the fixture 1000 can be mounted in a ceiling, for example. A mounting clip, or clips, 1010 are provided on the socket 1006 to attach the socket to the housing 1004. A junction box 1012 is provided near the fixture 1000 with wires 1016a, 1016b extending from the junction box 1012 to the socket 1006 through a conduit 1014 to provide power to the socket 1006, and thus, the incandescent lamp mounted therein. The socket 1006 is illustrated as a conventional Edison socket with a threaded opening to accommodate the threaded base of the incandescent lamp. The socket 1006, however, is not structured to accommodate a CFL. Thus, one of the obstacles to using CFLs in many applications is the fact that current fixtures are not capable of accommodating CFLs.

Some manufacturers have produced modified CFLs that have been adapted to screw into Edison sockets. In this case, a modified base is provided with threads. This modified base is usually integral with one end of a body that includes a ballast circuit used to convert the electrical power provided by the wires 1016a, 1016b, for example, to a suitable voltage to drive the CFL. The lighted or lamp portion of such a modified CFL extends from an opposite end of the body. Alternatively, the modified base and the body with ballast circuit may be implemented as an adapter that screws into an Edison socket, and a receptacle may be provided in the body to receive a standard CFL. In this case, the modified base and body serve as an adapter for the CFL. In either case, the inclusion of the body inside the housing 1004 of the fixture 1000, for example, takes up space that would normally be used to ensure that the light source, whether it be an incandescent lamp or a CFL remains recessed within the fixture 1000. Thus, when such a modified base and body is used, a portion of the CFL ordinarily extends out of the fixture and is clearly visible below the ceiling. This ruins the aesthetic appeal that is one of the major advantages of fixtures such as the downlight fixture 1000 described above.

There are light fixtures that are structured for use exclusively with traditional CFLs. In fact, in many locations, where CFL use is required, there is often a requirement to install such exclusive CFL fixtures so that users cannot substitute less efficient incandescent lamps for everyday use. For example, many fluorescent lamps require specific fluorescent lamp sockets that are different from standard screw-in Edison sockets for incandescent lamps. Further, these fluorescent light fixtures typically require that the ballast be mounted external to the light fixture, e.g., in the junction box 1012. Accordingly, at least four electrical wires must be provided through the conduit 1014 between the ballast in the junction box 1012 and the fluorescent lamp in the fluorescent socket in the fixture 1000, such that the ballast is able to provide the appropriate filament voltages to the filaments of the lamp. As a result, the power supplied from the ballast to the filaments of the lamp must travel over a relatively long distance from the junction box 1012 to the fluorescent lamp socket. This relatively long distance results in an undesirable increase in electromagnetic interference (EMI) and undesirable parasitic effects due to current leakage and capacitive coupling with the conduit 1014, for example.

Further, difficulties arise when a CFL is used in conjunction with a standard phase-control dimmer switch. An incandescent lamp can be dimmed simply by reducing the amount of power supplied to the incandescent lamp, e.g., by driving the incandescent lamp with a phase-controlled voltage as is well known to one of ordinary skill in the art. However, when a CFL is driven with a phase-controlled voltage, the CFL typically cannot be dimmed to a low light level. Often, the CFL completely turns off once the CFL is dimmed below a certain level. As a result, most CFLs cannot be dimmed below approximately 20% of their maximum light output when used with contemporary dimmer switches. Indeed, even many so-called "dimmable" CFLs or CFL adapters do not actually allow for dimming below a 20% threshold. Naturally, this performance limit is not desirable.

Accordingly, it is be desirable to provide a lamp assembly for a dimmable CFL for use in a ceiling mounted light fixture that avoids the problems discussed above.

SUMMARY OF THE INVENTION

According to the present invention, a ballasted lamp socket for a gas discharge lamp, such as a compact fluorescent lamp, is adapted to replace an Edison lamp socket in a light fixture. The ballasted lamp socket comprises a lamp-receiving portion adapted to be coupled to the gas discharge lamp, an enclosure mechanically coupled to the lamp-receiving portion, a dimming ballast circuit, and first and second electrical connections. The dimming ballast circuit is electrically coupled to the lamp-receiving portion and is housed within the enclosure. The ballast circuit is adapted to receive an AC line voltage, and to generate a high-frequency AC voltage for driving the gas discharge lamp and controlling the light intensity of the gas discharge lamp between a high-end intensity and a low-end intensity. The first and second electrical connections are operable to receive the AC line voltage and to provide the AC line voltage to the ballast circuit.

According to a second embodiment of the present invention, a ballasted lamp socket for a compact fluorescent lamp for use in a ceiling mounted light fixture includes a socket portion structured to accommodate the compact fluorescent lamp such that the compact fluorescent lamp is mountable in the socket portion, a ballast enclosure mechanically connected to the socket portion on an end opposite the end adapted to receive the compact fluorescent lamp, a dimming ballast circuit housed in the ballast enclosure and electrically connected to the socket portion for driving the compact fluorescent lamp, and a mounting clip structured to attach the ballasted lamp socket to the light fixture.

The present invention further provides a light fixture for a gas discharge lamp. The light fixture comprises a lamp-receiving portion adapted to be coupled to the gas discharge lamp, an enclosure mechanically coupled to the lamp-receiving portion, a dimming ballast circuit electrically coupled to the lamp-receiving portion and housed within the enclosure, and first and second electrical connections. The ballast circuit is adapted to receive an AC line voltage, and to generate a high-frequency AC voltage for driving the gas discharge lamp and controlling the light intensity of the gas discharge lamp between a high-end intensity and a low-end intensity. The first and second electrical connections are operable to receive the AC line voltage and to provide the AC line voltage to the ballast circuit. According to one embodiment of the present invention, the light fixture is adapted to be mounted in a ceiling. The light fixture further comprises a housing adapted to be mounted in the ceiling, and a bracket mechanically connected to the housing adapted to retain the ballasted lamp socket within the fixture. According to another embodiment of the present invention, the light fixture comprises a lamp base, which is adapted to either be placed on a substantially flat horizontal surface (i.e., a table or floor lamp), or mounted to a substantially vertical surface (i.e., wall sconce).

In addition, the present invention provides a light fixture for a compact fluorescent lamp that is adapted to be mounted in a ceiling. The light fixture comprises a housing adapted to be mounted in the ceiling, a bracket connected to the housing, and a ballasted lamp socket mechanically attached to the bracket. The ballasted lamp socket comprises a socket portion structured to accommodate a compact fluorescent lamp such that the compact fluorescent lamp is mountable in the socket portion, a ballast enclosure mechanically connected to the socket portion on an end opposite the end structures to accommodate the compact fluorescent lamp, a dimming ballast circuit housed in the ballast enclosure and electrically connected to the socket portion for driving the compact fluorescent lamp, and a mounting clip structured to attach the ballasted lamp socket to the bracket of the light fixture.

According to another aspect of the present invention, an enclosure for an electrical circuit comprises: a first element adapted to house the electrical circuit; a first opening in the first element, the first opening having a first area; a funnel-shaped portion having a first end provided at the first opening of the first element; and a second opening provided at a second end of the funnel-shaped portion. The second opening has a second area substantially smaller than a first area of the first opening. The first opening is adapted to receive an electrical wire, such that the funnel-shaped portion directs the electrical wire to be received by the second opening.

The present invention further provides a ballasted lamp socket for a gas discharge lamp comprising a lamp-receiving portion, an enclosure, a printed circuit board, and a ballast circuit. The lamp-receiving portion has a first end adapted to be coupled to the gas discharge lamp and a second end. The lamp-receiving portion also has an electrical wire extending from the second end. The enclosure is mechanically coupled to the lamp-receiving portion and comprises a funnel-shaped portion having first and second openings. The first opening is substantially larger than the second opening. The first opening is adapted to receive the electrical wire of the lamp-receiving portion, such that the funnel-shaped portion directs the electrical wire to be received by the second opening. The printed circuit board is housed within the enclosure and has a through-hole positioned adjacent the second opening, such that the through-hole is adapted to receive the electrical wire of the lamp-receiving portion. The ballast circuit is mounted on the printed circuit board and is electrically coupled to the lamp-receiving portion. The ballast portion is adapted to receive an AC line voltage and to generate a high-frequency AC voltage for driving the gas discharge lamp.

Other features and advantages of the present invention will become apparent from the following description of the invention, which refers to the accompanying drawings.

DETAILED DESCRIPTION OF EMBODIMENTS OF THE INVENTION

Figure 1:
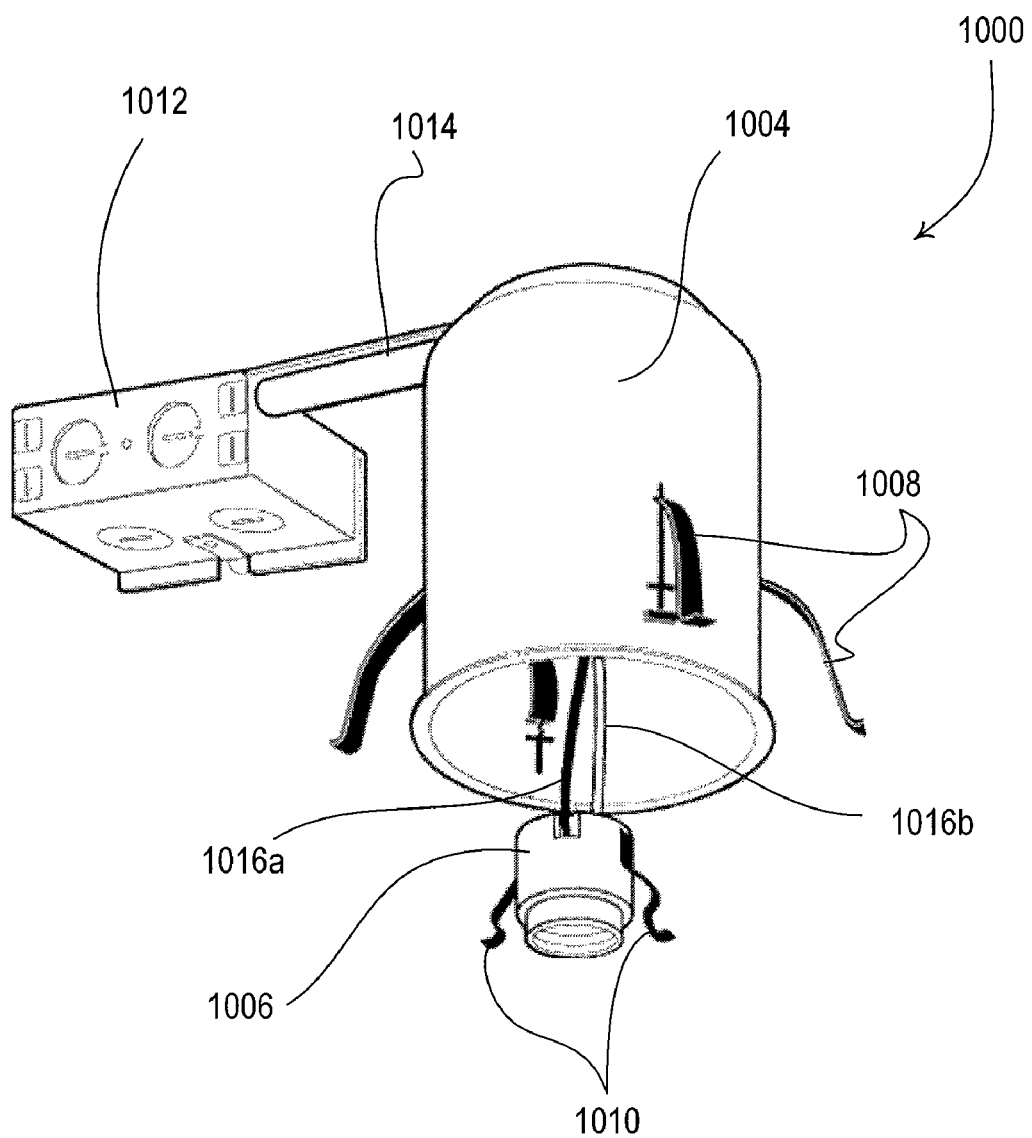
FIG. 1 is an illustration of a prior art light fixture including an Edison socket to accommodate an incandescent lamp.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
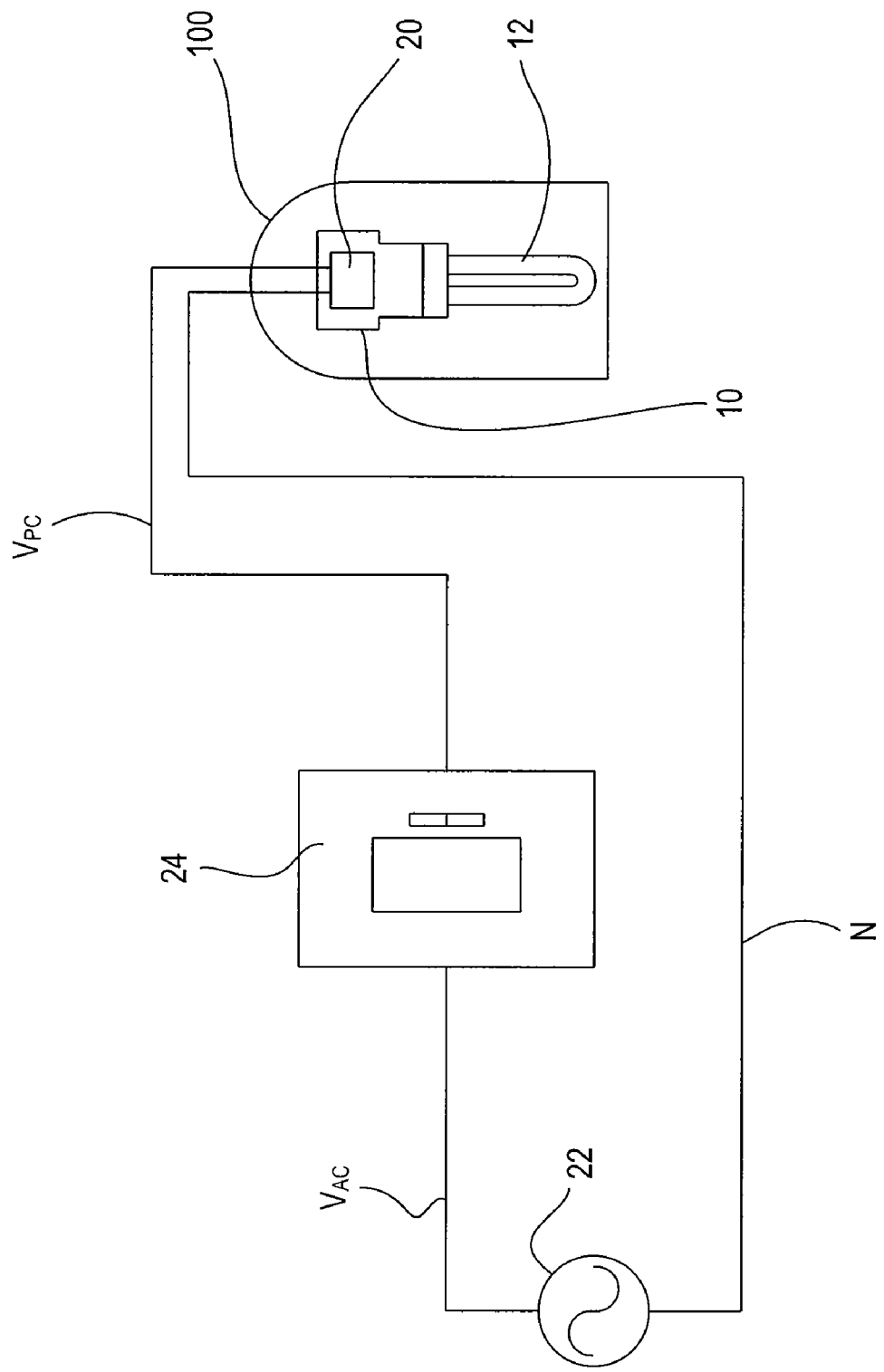
FIG. 2 is a simplified wiring diagram of a ballasted lamp socket mounted in a ceiling mounted light fixture according to a first embodiment of the present invention.

A ballasted lamp socket 10 for a compact fluorescent lamp 12 in accordance with the present invention is described with reference to FIGS. 2-14 of the present application. FIG. 2 is a simplified wiring diagram of the ballasted lamp socket 10 mounted in a ceiling mounted light fixture 100. The ballasted lamp socket 10 includes a ballast circuit 20 operable to receive an AC line voltage $V_{AC}$ from an AC power source 22 and to produce a high-frequency AC waveform for driving the fluorescent lamp 12. Preferably, the ballast circuit 20 comprises a two-wire dimming ballast circuit, which receives a phase-controlled voltage $V_{PC}$ from a standard dimmer switch 24 and generates an appropriate high-frequency AC voltage for dimming the intensity of the compact fluorescent lamp 12. The ballast circuit 20 is also coupled to a neutral connection N of the AC power source 22.

In a preferred embodiment, the ballast circuit 20 allows for a full range of dimming of the lamp 12. That is, the ballast circuit 20 is operable to provide a range of voltages to the lamp 12 that allows the lamp to be dimmed as low as approximately 1% of its total luminosity without premature shut-off of the lamp. A two-wire dimming ballast circuit is described in greater detail in commonly-assigned U.S. Pat. No. 6,111,368, issued Aug. 29, 2000, entitled SYSTEM FOR PREVENTING OSCILLATIONS IN A FLUORESCENT BALLAST, and commonly-assigned U.S. Pat. No. 6,452,344, issued Sep. 17, 2002, entitled ELECTRONIC DIMMING BALLAST. The entire disclosures of both patents are hereby incorporated by reference.

Figure 3:
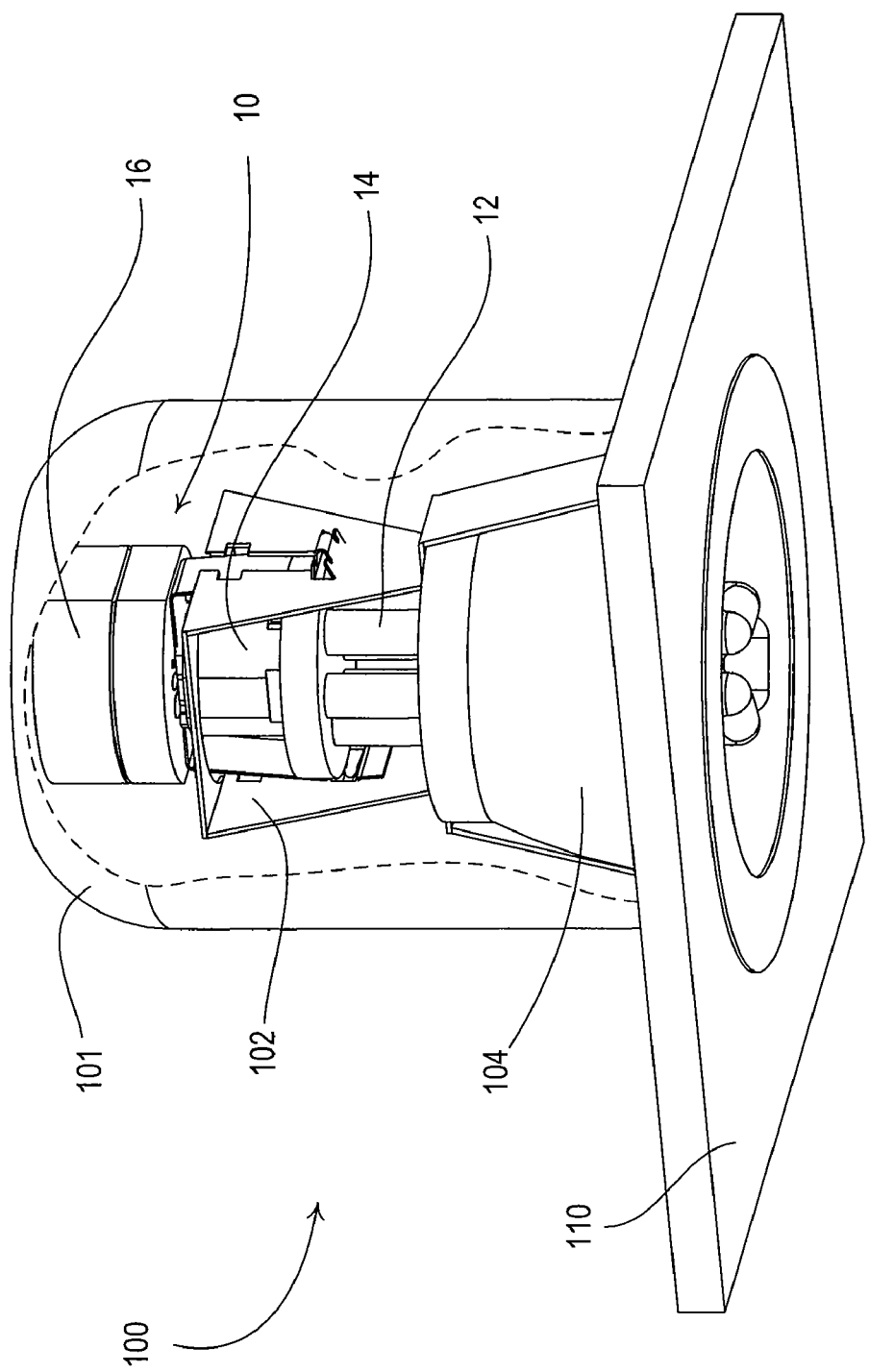
FIG. 3 is a perspective view of the ballasted lamp socket of FIG. 2 mounted in the ceiling mounted light fixture.
Figure 4:
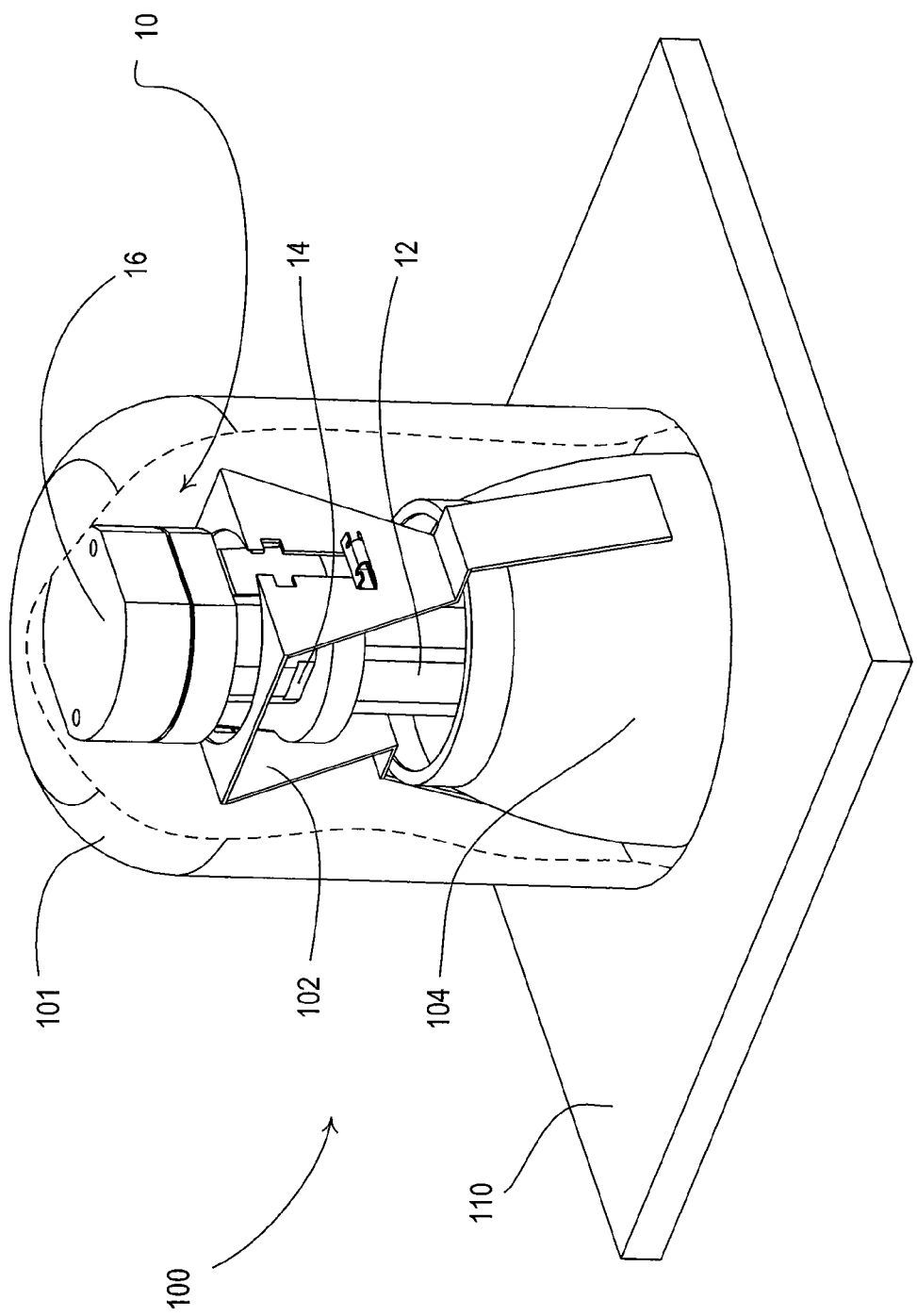
FIG. 4 is an alternate perspective view of the light fixture of FIG. 3.
Figure 5:
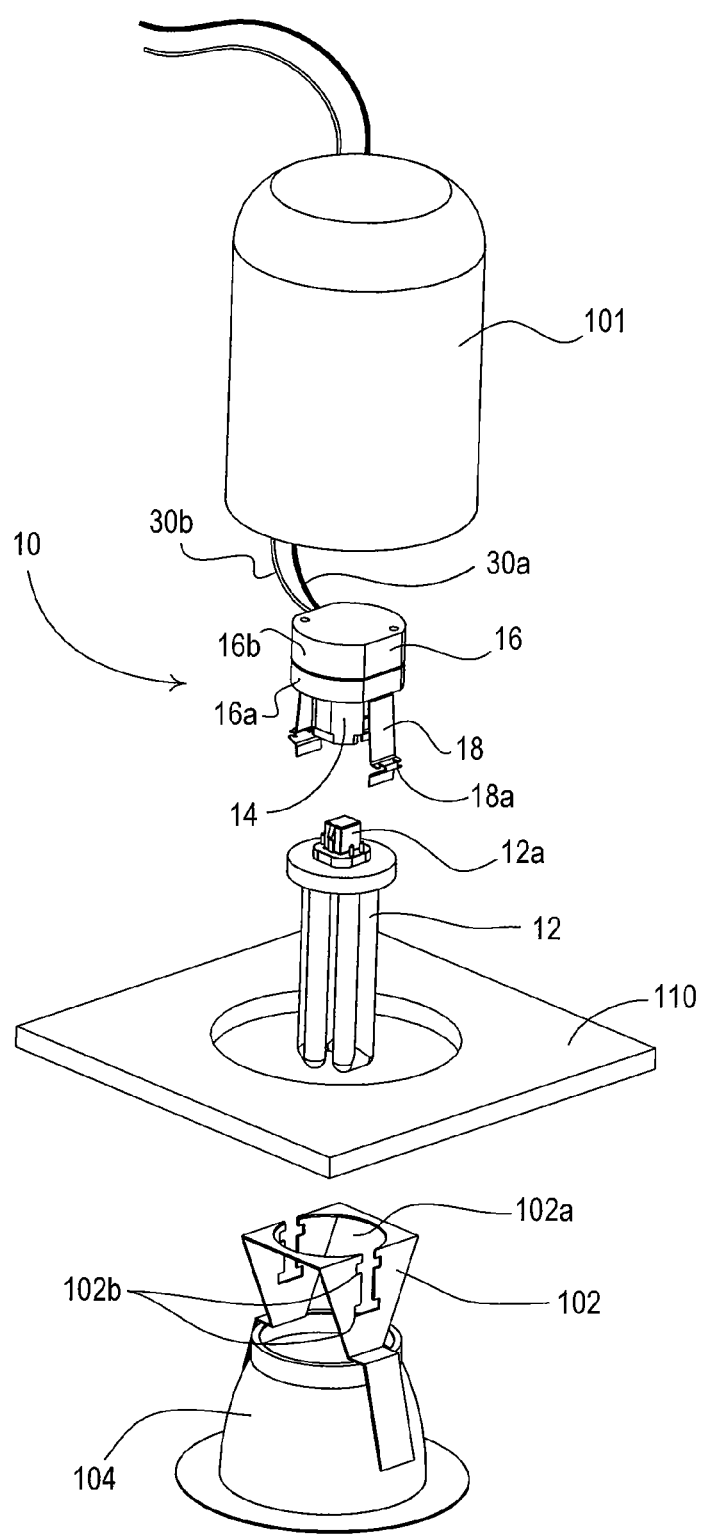
FIG. 5 is an exploded view of the light fixture and ballasted lamp socket of FIGS. 3 and 4.

FIGS. 3 and 4 are perspective views of the ballasted lamp socket 10 mounted in the ceiling mounted light fixture 100. FIG. 5 is an exploded view of the light fixture 100 and ballasted lamp socket 10 of FIGS. 3 and 4. The fixture 100 is preferably of a conventional design and is intended for mounting in a ceiling panel 110, for example. One example of such a fixture is the Halo™ line of fixtures sold by Cooper Lighting. The fixture 100 preferably includes a body 101 (i.e., a housing) in which a bracket 102 and a reflector 104 are mounted in a known manner. The body 101 may include one or more mounting clips (not shown) similar to the clips 1008 of FIG. 1 that are used to secure the fixture 100 in the ceiling panel 110.

Figure 6:
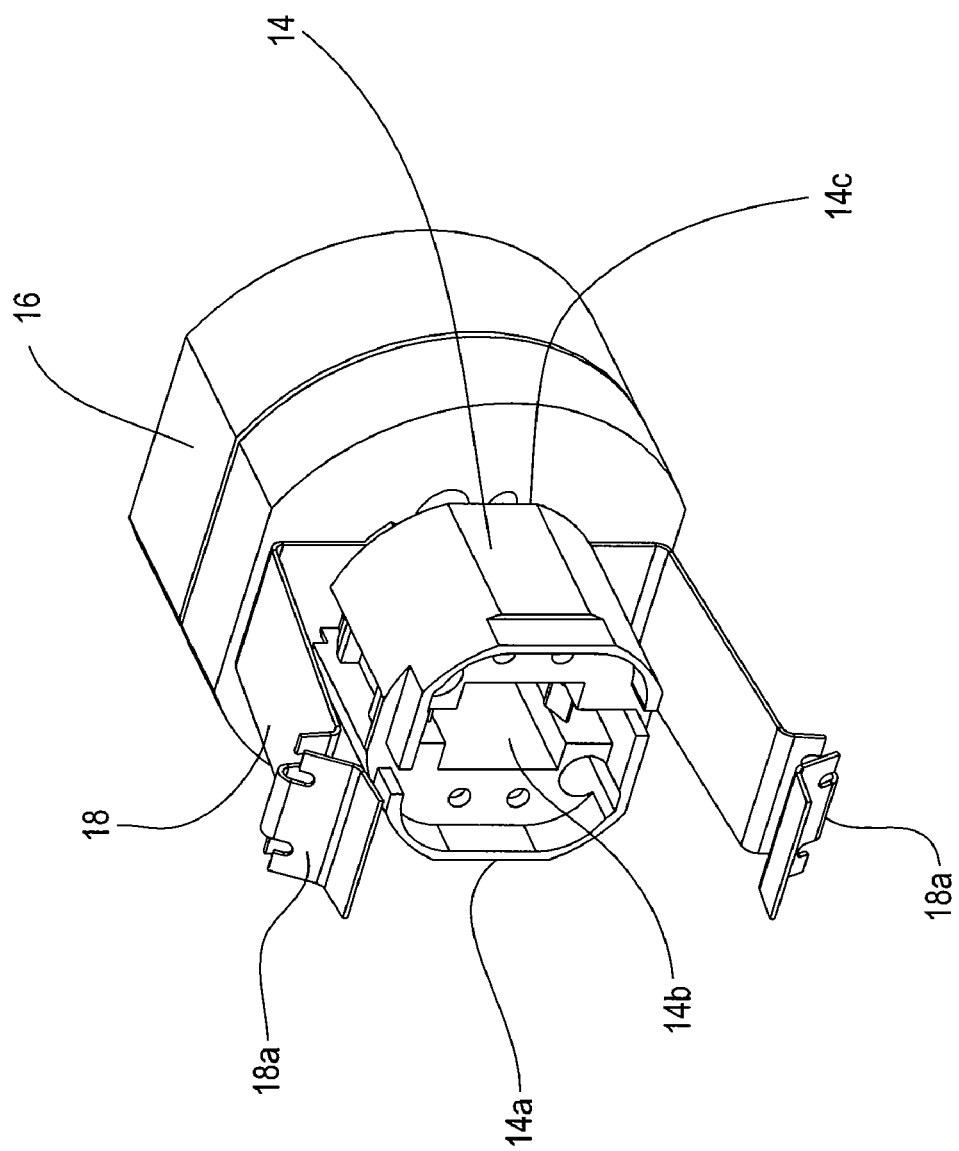
FIG. 6 is a perspective view of the ballasted lamp socket of FIGS. 3-5.
Figure 7:
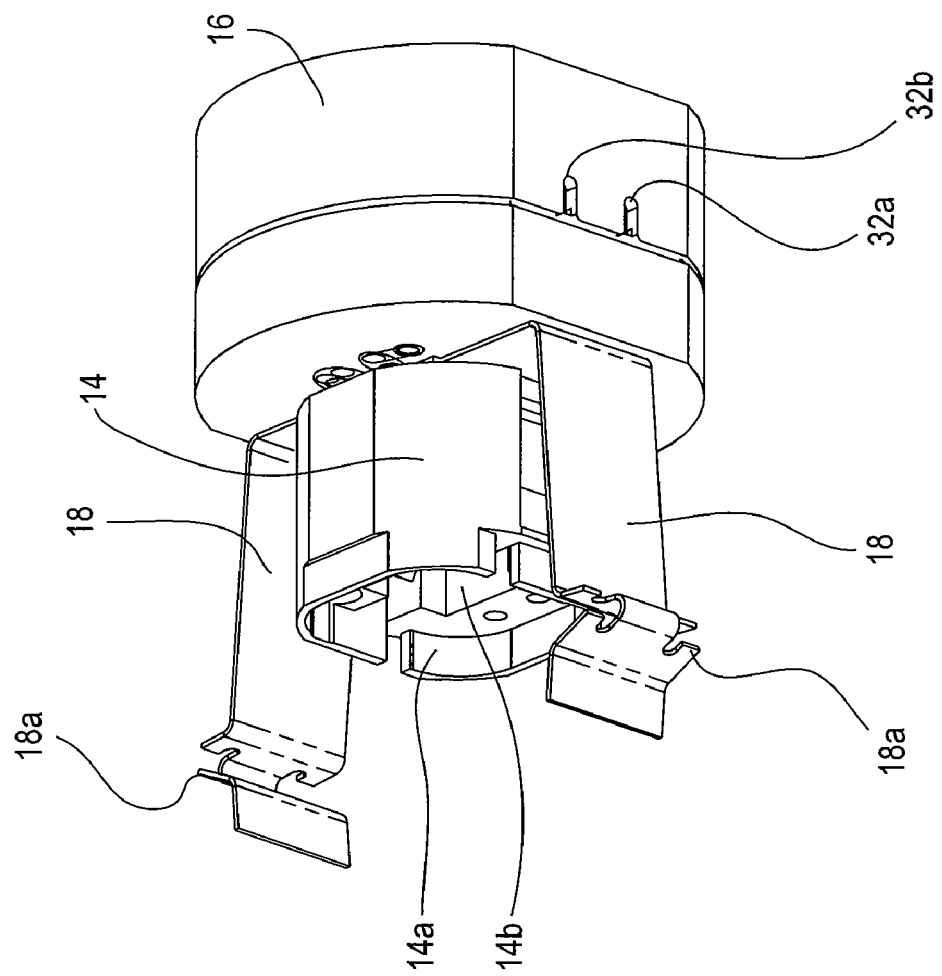
FIG. 7 is an alternate perspective view of the ballasted lamp socket of FIGS. 3-5.
Figure 8:
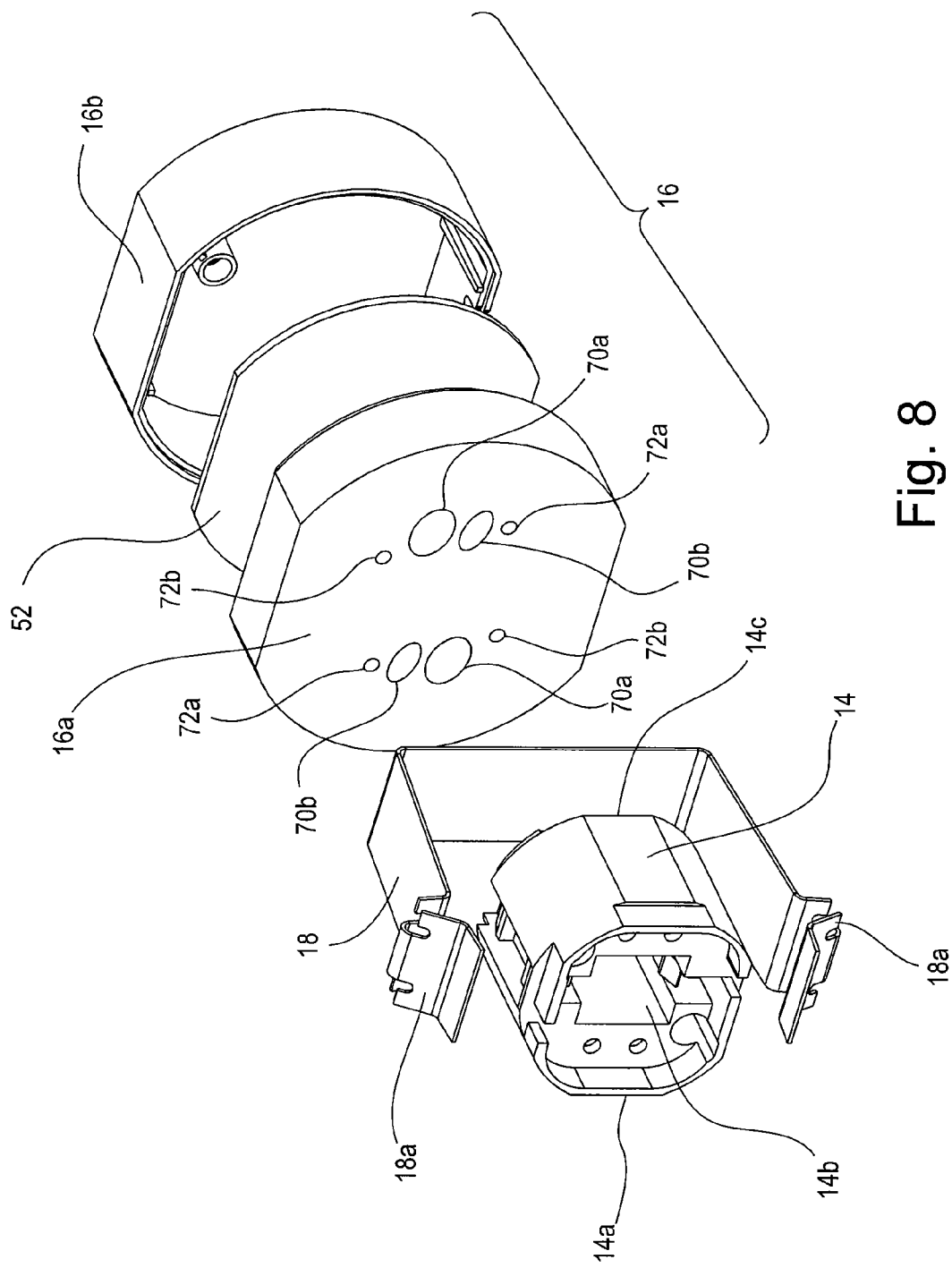
FIG. 8 is an exploded view of the ballasted lamp socket of FIGS. 6-7.

FIGS. 6 and 7 are perspective views of the ballasted lamp socket 10 and FIG. 8 is an exploded view of the ballasted lamp socket 10. The ballasted lamp socket 10 preferably includes a socket portion 14 (i.e., a lamp-receiving portion), a ballast enclosure 16 (i.e., a casing), and a mounting clip 18 (i.e., a retaining clip). The ballast circuit 20 is mounted on a ballast printed circuit board (PCB) 52, which is housed within the ballast enclosure 16. The socket portion 14 is mechanically coupled to the ballast enclosure 16, and is adapted to receive the compact fluorescent lamp 12 therein. As shown in FIGS. 6-8, the socket portion 14 is attached to the ballast enclosure 16 using screws (not shown) received in retaining openings 72a, 72b of the ballast enclosure. However, the socket portion 14 could be formed as an integral part of the ballast enclosure 16. For example, the socket portion 14 and the ballast enclosure 16 could be molded as the same physical part.

The mounting clip 18 is attached to the socket portion 14 and the ballast enclosure 16, and is used to attach the ballasted lamp socket 10 to the bracket 102 of the fixture 100. Preferably, the mounting clip 18 is positioned between the ballast enclosure 16 and the socket 14.

The compact fluorescent lamp 12 may be any kind of compact fluorescent lamp (CFL). That is, the lamp 12 may be of any available size or wattage. As is best illustrated in FIG. 5, the socket portion 14 includes an open end 14a that is adapted to receive a base 12a of the lamp 12 (see FIG. 6, for example). Typically, the open end 14a of the socket portion 14 includes one or more openings 14b into which the base 12a of the lamp 12 extends. These openings 14b are preferably sized and positioned to accommodate the base 12a of a specific type of lamp 12. The size and shape of the base 12a and the opening 14b in the socket portion 14 are set such that the ballasted lamp socket 10 can only accept a lamp for which it is designed to operate. This prevents the possibility of installing the wrong size or wattage CFL in any particular open end 14a of the socket portion 14. The modular nature of the ballasted lamp socket 10 allows the ballast enclosure 16 to be connected to a plurality of different socket portions 14, such that multiple ballast lamp sockets 10 for usage with multiple lamp types may be offered.

As is best illustrated in FIGS. 6-8, the ballast enclosure 16 is preferably connected to a base end 14c of the socket portion 14. The base end 14c of the socket portion 14 is positioned opposite the open end 14a of the socket 14 in which the lamp 12 is mounted. The ballast enclosure 16 includes a front element 16a and a rear element 16b opposite the front element.

The ballast PCB 52 is mounted in the ballast enclosure 16 between the front element 16a and the rear element 16b. Specifically, the ballast PCB 52 is connected to the front element 16a of the enclosure 16. While the ballast circuit 20 is preferably mounted on the ballast PCB 52, the present invention is not limited to this embodiment and the ballast circuit may be implemented in any appropriate manner. The ballast circuit 20 is covered by the rear element 16b of the casing 16. The rear element 16b covers the ballast circuit such that there is a small gap between a surface of the ballast PCB 52 and the rear element 16b to accommodate various components of the ballast circuit 20. In addition, there may be a small space between the opposite surface of the ballast PCB 52 and the rear surface of the front element 16a to accommodate circuit components as well.

The ballast circuit 20 of the ballast PCB 52 is electrically coupled to the phase-controlled voltage $V_{PC}$ and the neutral connection N via two electrical connections, i.e., two electrical wires 30a, 30b (FIG. 5). The ballast circuit 20 is electrically coupled to the socket portion 14 to drive the lamp 12, and generates the high-frequency AC voltage required by the lamp 12. The electrical wires 30a, 30b enter the body 101 via an opening (not shown). The electrical wires 30a, 30b are receiving by the ballast enclosure 16 via openings 32a, 32b (FIG. 7) and are electrically coupled to the ballast circuit 20 on the ballast PCB 52. In a preferred embodiment, the electrical wires 30a, 30b comprise "flying leads" and are permanently electrically connected to the ballast PCB 52. Alternatively, the electrical wires 30a, 30b could include "stab-in" connections, and the ballasted lamp socket 10 could comprise two stab-in connectors operable to receive the stab-in connections of the electrical wires.

Figure 9:
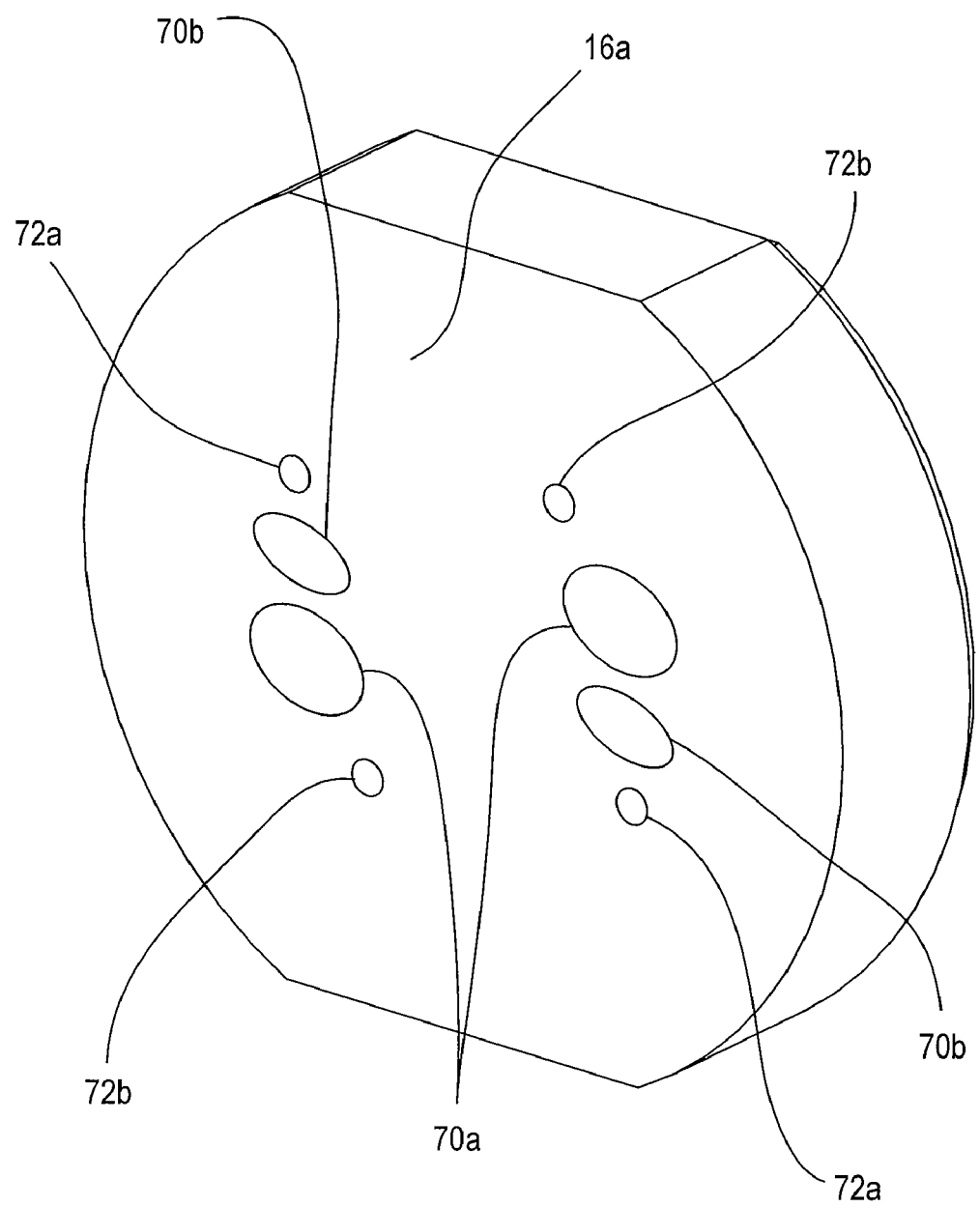
FIG. 9 is a perspective view of a front element of a ballast enclosure of the ballasted lamp socket of FIGS. 6-8.
Figure 10:
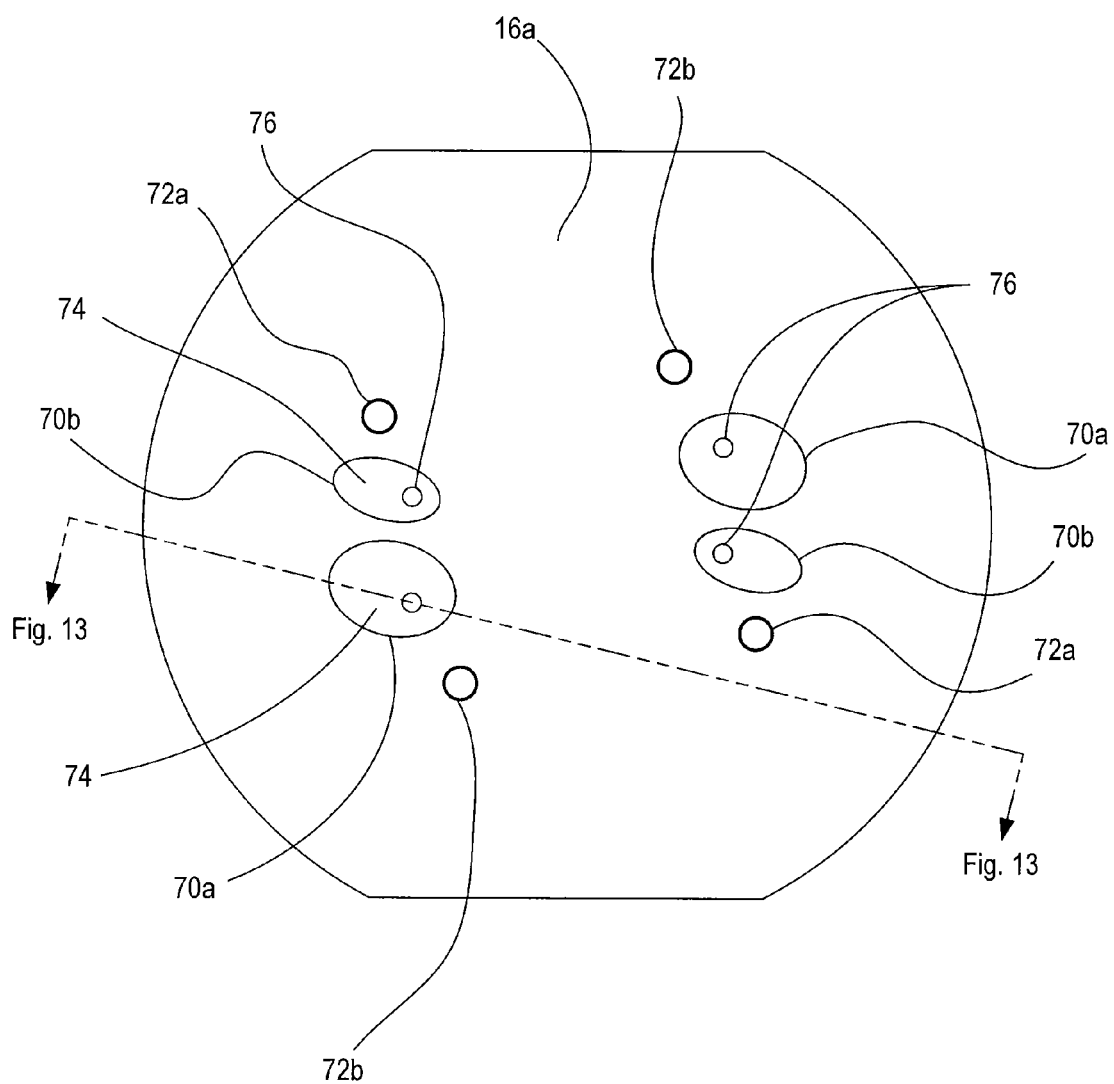
FIG. 10 is an alternate perspective view of the front element of FIG. 9.
Figure 11:
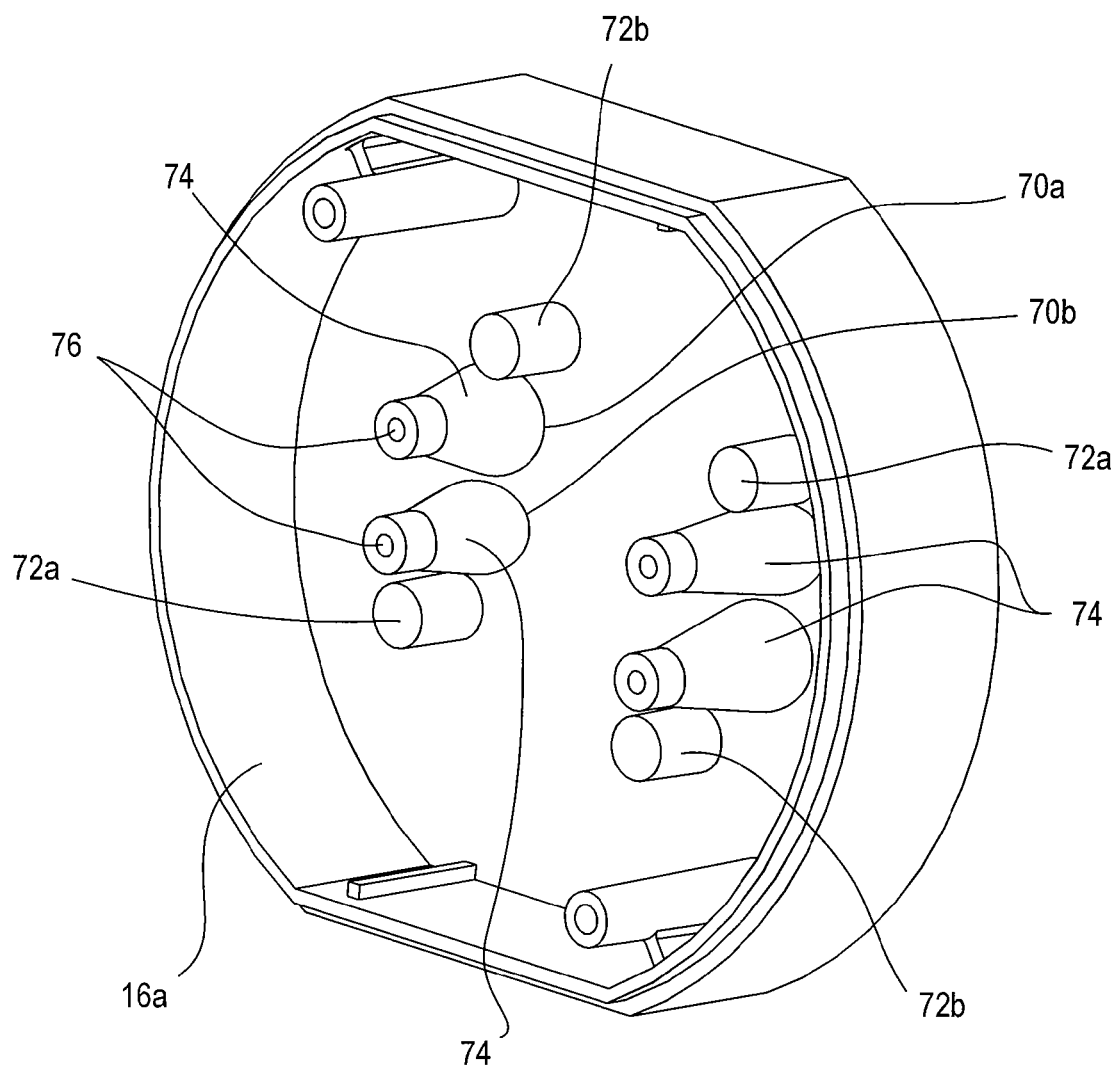
FIG. 11 is a rear perspective view of the front element of FIGS. 9-10.

FIGS. 9 and 10 are front perspective views and FIG. 11 is a rear perspective view of the front element 16a of the ballast enclosure 16. The front element 16a of the ballast enclosure 16 is connected to the socket portion 14. The front element 16a of the enclosure 16 includes a plurality of wire openings 70a, 70b formed therein that allow wires (not shown) from the socket portion 14 to pass through the enclosure 16 to thus electrically connect the socket portion and the ballast circuit on the ballast PCB 52.

Figure 12A:
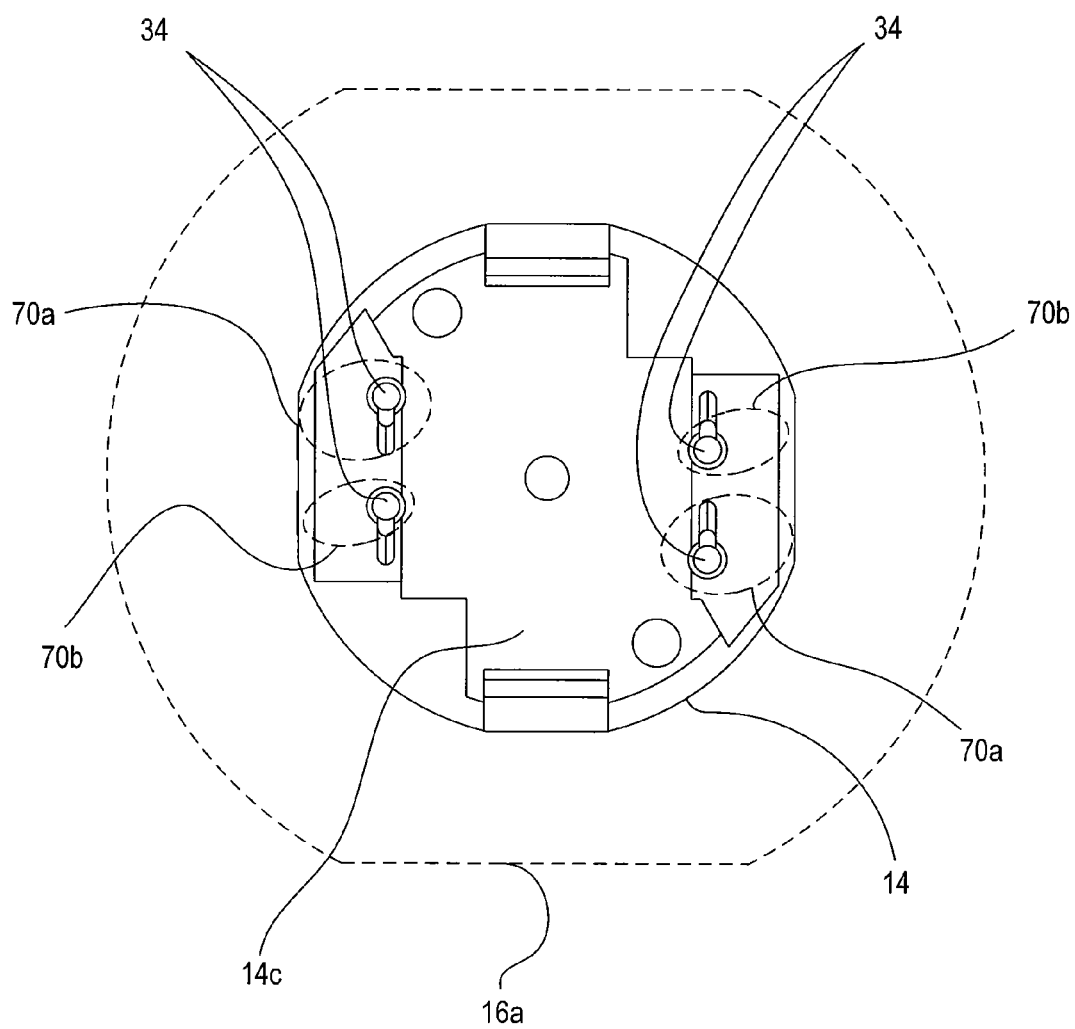
FIGS. 12A, 12B, and 12C are rear views of different socket portions of the ballasted lamp socket of FIGS. 6-8.
Figure 12B:
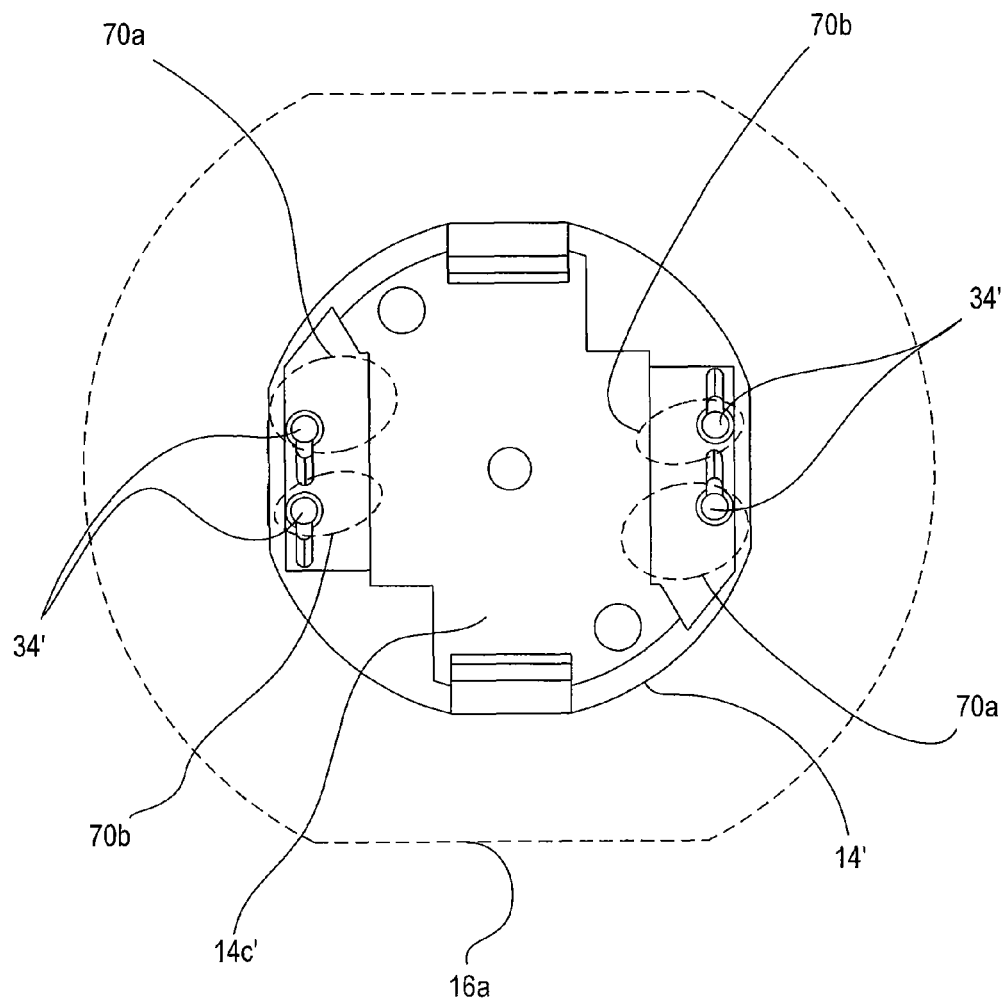
Figure 12C:
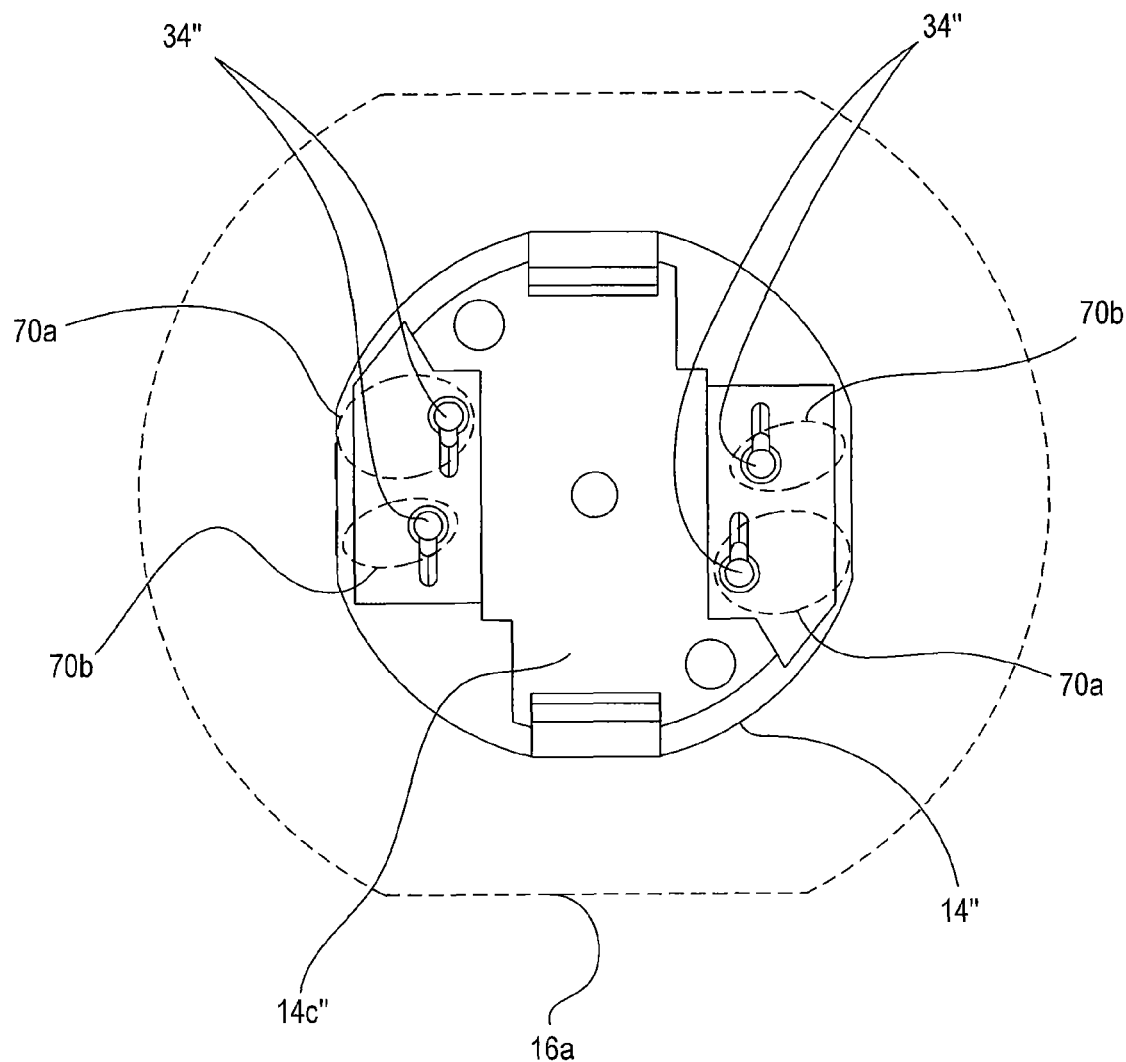

The socket portion 14 may be purchased from a plurality of various manufacturers of such sockets. Because of differences between the sockets, the wires of the socket portion 14 as produced by various manufacturers exit the base end 14c at different locations. For example, FIGS. 12A, 12B, and 12C are rear views of the socket portions 14, 14', 14" (i.e., the base ends 14c, 14c', 14c") as produced by three different manufacturers. Each of the base ends 14c, 14c', 14c" has openings 34, 34', 34", respectively. The wires that connect the sockets portions 14, 14', 14" to the ballast PCB 52 are received in the openings 34, 34', 34".

In order to accommodate socket portions 14 from different manufacturers, the openings 70a, 70b are shaped as ellipses and are connected to substantially funnel-shaped portions 74. The funnel-shaped portions 74 have larger openings (i.e., the openings 70a, 70b) on first ends close to the socket portion 14, and smaller openings 76 on second ends opposite the first ends. For example, the openings 70a have radii of approximately 0.140 inch and 0.190 inch, while the openings 70b have radii of approximately 0.089 inch and 0.162 inch. The smaller openings 76 have radii of, for example, approximately 0.060 inch, such that the smaller openings are operable to receive bare, non-insulated 18-gauge electrical wires.

Figure 13:
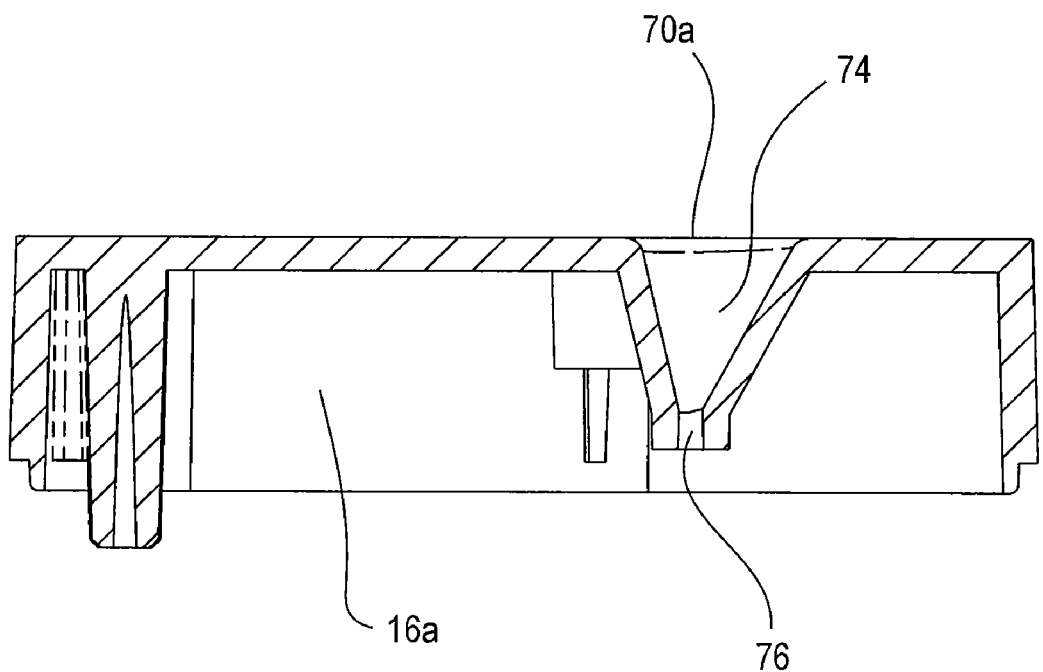
FIG. 13 is a side cross-sectional view of the front element taken along a line as shown in FIG. 10.

FIG. 13 is a side cross-sectional view of the front element 16a taken along a line as shown in FIG. 10, i.e., through one of the funnel-shaped portions 74. The funnel-shaped portions 74 allow the ballast enclosure 16 to be compatible with a wide variety of presently available CFL socket portions. The front element 16a and the larger openings (i.e., the openings 70a, 70b) of the enclosure 16 are shown as dashed lines in FIGS. 12A, 12B, 12C to illustrate that the wires from the openings 34, 34', 34" of the various base ends 14c, 14c', 14c" will be received in the openings 70a, 70b. Preferably, the smaller openings 76 are positioned adjacent the appropriate throughholes of the ballast PCB 52. The funnel-shaped portions 74 guide the wires through the front element 16a to the smaller openings 76 and ensure that the wires from the socket portion 14 will be aligned with the proper through-holes of the ballast PCB 52 even if the wires from the socket portion 14 are slightly out of alignment when exiting the base end 14c.

The front element 16a includes two pairs of retaining openings 72a, 72b. These openings 72a, 72b are used to secure the ballast enclosure 16 and the socket portion 14. The retaining openings 72a, 72b are preferably spaced such that the ballast enclosure 16 may be attached to the multiple socket portions 14, 14', 14" (as discussed with reference to FIGS. 12A, 12B, 12C). Each opening preferably accommodates a screw (not shown) that is used to fasten the enclosure 16 to the socket portion 14.

The mounting clip 18 is attached to the ballasted lamp socket 10 between the socket portion 14 and the enclosure 16. The clip 18 is substantially U-shaped with the two legs of the U-shape including protrusions 18a that are used to attach the clip 18 to the bracket 102 of the fixture 100. The flat part of the U-shape is preferably positioned between the front portion 16a of the ballast enclosure 16 and the base end 14c of the socket 14. In this manner, the socket portion 14 is positioned in front of the clip 18 and the ballast enclosure 16 is positioned behind the clip 18. The wires that connect the ballast PCB 52 and the socket portion 14 preferably pass on either side of the flat part of the mounting clip 18. Alternatively, the mounting clip 18 could be attached to the rear element 16b of the ballast enclosure 16.

By separating the socket portion 14 and the ballast enclosure 16, the ballasted lamp socket 10 is easily used in conjunction with a conventional lamp fixture 100 while avoiding the problem of the lamp 12 extending down from the ceiling tile 110 such that it is visible. However, by closely positioning the ballast enclosure 16 and the ballast PCB 52 to the socket portion 14, the distance between the ballast circuit and the socket portion is substantially reduced. As a result, there is a significant reduction in both EMI and undesirable parasitic effects when compared to those in the conventional CFL assemblies described above.

The ballast enclosure 16 is preferably sized such that it fits within the opening 102a in the top of the bracket 102 (see FIG. 5, for example). As a result, the ballasted lamp socket 10 can be connected to the fixture 100 in a variety of positions. As illustrated in FIG. 5, for example, the bracket 102 may include multiple slots 102b in which the protrusions 18a of the mounting clip 18 may be seated to attach the ballasted lamp socket 10 to the fixture 100. Since the ballast enclosure 16 can fit through the opening 102a in the bracket 102, the ballasted lamp socket 10 can be adjusted in height relative to the fixture 100, as desired.

It is noted that the fixture 100 is similar in structure to most currently available ceiling mounted fixtures. Thus, the ballasted lamp socket 10 of the present application can be easily mated with any such currently available fixture.

Figure 14:
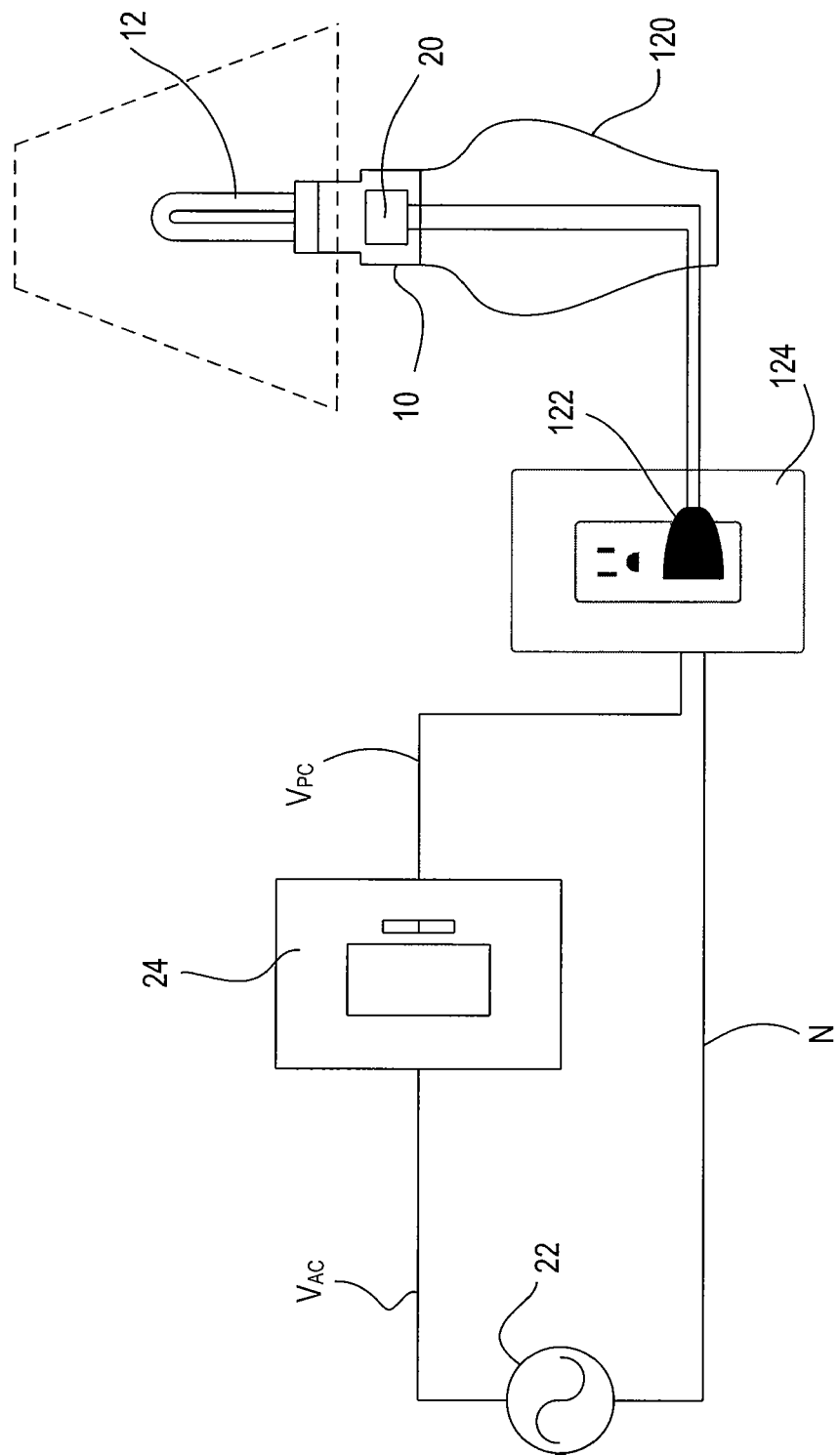
FIG. 14 is a simplified wiring diagram showing the ballasted lamp fixture of FIGS. 6-8 installed in a table lamp.

While the ballasted lamp socket 10 of the present invention is described herein as being mounted in the ceiling mounted light fixture 100, the present invention is not limited to use in only ceiling mounted light fixtures. Alternatively, the ballasted lamp socket 10 could replace the socket of a typical table lamp or floor lamp. FIG. 14 is a simplified wiring diagram showing the ballasted lamp fixture 10 installed in a table lamp base 120. The lamp base 120 is adapted to be placed on a substantially flat horizontal surface (i.e., a table surface). Preferably, the lamp base 120 includes a plug 122, which has two electrical connections and is plugged into an electrical outlet 124. The dimmer 24 is electrically coupled to the outlet 124 to control the voltage provided to the outlet. The phase-controlled voltage $V_{PC}$ from the dimmer 24 is provided to the ballasted lamp socket 10 via the outlet 124. According to another alternative embodiment, the lamp base 120 could be adapted to be mounted to a wall (i.e., a substantially vertical surface), such that the ballasted lamp socket 10 may be used in a wall-mounted light fixture, such as a wall sconce.

Further, the present invention is not limited to only two-wire dimming ballast circuits. For example, the ballasted lamp socket 10 could alternatively include a three-wire dimming ballast circuit, which is adapted to receive three electrical connections: the full AC line voltage $V_{AC}$ as generated by the AC power source 22, the neutral connection N, and a dimming control signal, e.g., the phase-control signal $V_{PC}$. A three-wire dimming ballast circuit is described in greater detail in commonly-assigned U.S. Pat. No. 6,674,248, issued Jan. 6, 2004, entitled ELECTRONIC BALLAST, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:
1. A ballasted lamp socket for a compact fluorescent lamp for use in a ceiling mounted light fixture, the ballasted lamp socket comprising:
   a socket portion structured to accommodate the compact fluorescent lamp such that the compact fluorescent lamp is mounted in the socket portion;

a ballast enclosure mechanically connected to the socket portion on an end opposite the compact fluorescent lamp;

a dimming ballast circuit housed in the ballast enclosure and electrically connected to the socket portion for driving the compact fluorescent lamp; and a mounting clip structured to attach the ballasted lamp socket to the light fixture.

2. The ballasted lamp socket of claim 1, wherein the mounting clip is positioned between the socket portion and the ballast enclosure.

3. The ballasted lamp socket of claim 2, wherein the mounting clip is U-shaped such that a flat portion of the mounting clip is positioned between the socket portion and the ballast enclosure.

4. The ballasted lamp socket of claim 1, wherein the ballast enclosure further comprises a front element mechanically connected to the socket portion, a rear element, and a ballast printed circuit board mounted between the front element and the rear element, the dimming ballast circuit mounted on the ballast printed circuit board.

5. The ballasted lamp socket of claim 4, wherein the front element further comprises at least one wire opening formed therein, wherein the wire opening is structured to allow a wire to extend from the socket portion through the front element and to the ballast circuit on the ballast printed circuit board.

6. The ballasted lamp socket of claim 5, wherein the wire opening is substantially funnel-shaped such that a first area of the wire opening on a first end adjacent to the socket portion is larger than a second area of the wire opening on a second end opposite the first end.

7. The ballasted lamp socket of claim 6, wherein the second end of the wire opening is positioned such that the wire that passes through the wire opening is aligned with a desired contact point of the ballast printed circuit board.

8. The ballasted lamp socket of claim 6, wherein the wire that passes through the wire opening passes between the socket portion and the front element of the ballast enclosure at a point adjacent to a flat portion of the mounting clip.

9. The ballasted lamp socket of claim 8, wherein the ballast circuit provides a driving voltage to the socket portion via the wire to energize the compact fluorescent lamp mounted in the socket portion.

10. A light fixture for a compact fluorescent lamp, the light fixture adapted to be mounted in a ceiling, the light fixture comprising:

a housing adapted to be mounted in the ceiling;

a bracket connected to the housing;

a ballasted lamp socket mechanically attached to the bracket; and wherein the ballasted lamp socket comprises:

a socket portion structured to accommodate a compact fluorescent lamp such that the compact fluorescent lamp is mountable in the socket portion;

a ballast enclosure mechanically connected to the socket portion on an end opposite the end structured to accommodate the compact fluorescent lamp;

a dimming ballast circuit housed in the ballast enclosure and electrically connected to the socket portion for driving the compact fluorescent lamp; and a mounting clip structured to attach the ballasted lamp socket to the bracket of the light fixture.

11. The light fixture of claim 10, wherein the bracket further comprises a plurality of slots structured to accommodate a portion of the mounting clip of the ballasted lamp socket such that the ballasted lamp socket is connected to the bracket in one of a plurality of positions based on a connection between the mounting clip and a selected slot of the plurality of slots.

12. The light fixture of claim 10, wherein the bracket further comprises at least one slot structured to accommodate a portion of the mounting clip of the ballasted lamp socket such that the ballasted lamp socket is connected to the bracket.

13. The light fixture of claim 12, wherein the bracket further comprises a top opening formed in a top portion of the bracket to allow the ballasted lamp socket to be moved up and down relative to the light fixture.

14. The light fixture of claim 13, wherein the ballast enclosure further comprises a front element mechanically connected to the socket portion, a rear element, and a ballast printed circuit board mounted between the front element and the rear element, the dimming ballast circuit mounted on the ballast printed circuit board.

15. The light fixture of claim 14, wherein the front element further comprises at least one wire opening formed therein, wherein the wire opening is structured to allow a wire to extend from the socket portion through the front element and to the ballast circuit on the ballast printed circuit board.

16. The light fixture of claim 15, wherein the wire opening is substantially funnel-shaped such that a first area of the wire opening on a first end adjacent to the socket portion is larger than a second area of the wire opening on a second end opposite the first end.

17. The light fixture of claim 15, wherein the second end of the wire opening is positioned such that the wire that passes through the wire opening is aligned with a desired contact point of the ballast printed circuit board.

18. The light fixture of claim 17, wherein the wire that passes through the wire opening passes between the socket portion and the front element of the ballast enclosure at a point adjacent to the flat portion of the mounting clip.

19. The light fixture of claim 13, wherein the mounting clip is U-shaped and has a flat portion that is positioned between the socket portion and the ballast enclosure.

* * * * *